US010749639B2

(12) United States Patent
Jheng et al.

(10) Patent No.: US 10,749,639 B2
(45) Date of Patent: Aug. 18, 2020

(54) BEARER SWITCHING IN REDUCED RADIO LINK QUALITY CONDITIONS

(71) Applicant: MEDIATEK INC., Hsinchu (TW)

(72) Inventors: Yu-Syuan Jheng, Hsinchu (TW); Yuanyuan Zhang, Beijing (CN); Yuan-Wen Ting, Hsinchu (TW); Pei-Shan Kao, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/878,084

(22) Filed: Jan. 23, 2018

(65) Prior Publication Data
US 2018/0213456 A1 Jul. 26, 2018

Related U.S. Application Data

(60) Provisional application No. 62/449,687, filed on Jan. 24, 2017.

(51) Int. Cl.
*H04W 36/14* (2009.01)
*H04L 1/18* (2006.01)
(Continued)

(52) U.S. Cl.
CPC .......... *H04L 1/1861* (2013.01); *H04B 17/391* (2015.01); *H04L 1/1628* (2013.01);
(Continued)

(58) Field of Classification Search
CPC .... H04L 1/1861; H04L 1/1628; H04W 76/20; H04W 76/15; H04W 24/10; H04W 36/08;
(Continued)

(56) References Cited

U.S. PATENT DOCUMENTS

2004/0100924 A1 5/2004 Yam
2005/0063303 A1 3/2005 Samuels
(Continued)

FOREIGN PATENT DOCUMENTS

CN 102299899 A 12/2011
CN 104168617 A 11/2014
(Continued)

OTHER PUBLICATIONS

International Search Report and Written Opinion dated Apr. 16, 2018 in PCT/CN2018/074006, 9 pages.
(Continued)

*Primary Examiner* — Mohamed A Kamara
(74) *Attorney, Agent, or Firm* — Oblon, McClelland, Maier & Neustadt, L.L.P.

(57) ABSTRACT

A wireless transmit receive unit (WTRU) is configured in dual connectivity with a master cell group and a secondary cell group. Uplink (UL) data is sent in an active one of the master cell group and the secondary cell group as an active UL transmission cell group. It is determined whether a UL transmission is to be switched to an alternate one of the master cell group and the secondary cell group and the UL traffic is switched from the active UL transmission cell group to the alternate cell group in response to the determination that the UL transmission is to be switched.

20 Claims, 11 Drawing Sheets

(51) Int. Cl.
| | |
|---|---|
| *H04L 1/16* | (2006.01) |
| *H04W 28/02* | (2009.01) |
| *H04B 17/391* | (2015.01) |
| *H04W 76/20* | (2018.01) |
| *H04W 76/15* | (2018.01) |
| *H04W 36/08* | (2009.01) |
| H04L 12/801 | (2013.01) |
| H04B 17/318 | (2015.01) |
| H04B 17/336 | (2015.01) |
| H04W 24/10 | (2009.01) |

(52) U.S. Cl.
CPC ....... *H04W 28/0273* (2013.01); *H04W 36/08* (2013.01); *H04W 76/15* (2018.02); *H04W 76/20* (2018.02); *H04B 17/318* (2015.01); *H04B 17/336* (2015.01); *H04L 1/1621* (2013.01); *H04L 47/12* (2013.01); *H04W 24/10* (2013.01); *H04W 36/14* (2013.01)

(58) Field of Classification Search
CPC ..... H04W 36/20; H04W 36/24; H04W 36/28; H04B 17/391; H04B 17/318; H04B 17/336
See application file for complete search history.

(56) References Cited

U.S. PATENT DOCUMENTS

| | | |
|---|---|---|
| 2006/0067222 A1 | 3/2006 | Endoh |
| 2006/0239213 A1 | 10/2006 | Frederiks |
| 2008/0095099 A1 | 4/2008 | Kesselman |
| 2008/0096560 A1* | 4/2008 | Felske ............. H04W 36/00837 455/436 |
| 2009/0125615 A1 | 5/2009 | Murray et al. |
| 2010/0113008 A1 | 5/2010 | Wang et al. |
| 2013/0229920 A1 | 9/2013 | Johansson et al. |
| 2015/0085665 A1 | 3/2015 | Kompella et al. |
| 2015/0146692 A1* | 5/2015 | Yi .......................... H04W 36/24 370/331 |
| 2015/0319678 A1 | 11/2015 | Johansson et al. |
| 2016/0212680 A1 | 7/2016 | Talukdar et al. |
| 2016/0286430 A1 | 9/2016 | Abiri et al. |
| 2016/0337916 A1 | 11/2016 | Deenoo et al. |
| 2017/0012822 A1* | 1/2017 | Zhang ................. H04L 12/6418 |
| 2017/0063498 A1 | 3/2017 | Venkatsuresh et al. |
| 2017/0171786 A1* | 6/2017 | Mochizuki ...... H04W 36/00835 |
| 2017/0290015 A1* | 10/2017 | Xu ........................ H04W 36/00 |
| 2018/0132133 A1 | 5/2018 | Takahashi et al. |
| 2018/0227219 A1 | 8/2018 | Zhang et al. |
| 2018/0249388 A1* | 8/2018 | Baek ..................... H04W 36/02 |
| 2019/0053315 A1 | 2/2019 | Yiu |
| 2019/0246286 A1 | 8/2019 | Henttonen |

FOREIGN PATENT DOCUMENTS

| | | |
|---|---|---|
| CN | 104995950 A | 10/2015 |
| CN | 105144787 A | 12/2015 |
| CN | 106231637 A | 12/2016 |
| WO | 01/31833 A1 | 5/2001 |
| WO | 2012/107854 A1 | 8/2012 |
| WO | 2017/034269 A1 | 3/2017 |

OTHER PUBLICATIONS

3GPP TSG-RAN WG2 Meeting #94, R2-163438, "Dual Connectivity for LTE-NR tight interworking", 9.4.1.2, Nokia, Alcatel-Lucent Shanghai Bell, May 23-27, 2016, 2 pages.
Office Action dated Aug. 9, 2019 in U.S. Appl. No. 15/878,111.
Office Action dated Aug. 1, 2019 in U.S. Appl. No. 15/878,115.
Office Action dated Aug. 14, 2019 in Taiwanese Application No. 10820768610.
International Search Report and Written Opinion dated Mar. 29, 2018 in PCT/CN2018/073993, (10 pages).
Office Action dated Oct. 7, 2019 in U.S. Appl. No. 15/878,111.
Supplemental Partial European Search Report dated Dec. 16, 2019 in European Application No. 18745337.8.
Nokia Alcatel-Lucent Shanghai Bell: "Beam Recovery in NR", 3GPP DRAFT; RI-1612865, 3RD Generation Partnership Project (3GPP), Mobile Competence Centre; 650, Route Des Lucioles; F-06921 Sophia-Antipolis Cedex,; France, vol. RAN WGI, no. Reno, U.S.A.; 20161114-20161118, Nov. 13, 2016 (Nov. 13, 2016), XP051176806, Retrieved from the Internet: URL:http://www.3gpp.org/ftp/Meetings-3GPP-SYNC/RANI/Docs/ [retrieved on Nov. 13, 2016].
Office Action dated Dec. 5, 2019 in Taiwanese Application No. 10821159960.

* cited by examiner

| W | D | V(km/hr) | OUTAGE INTERVAL (s) |
|---|---|---|---|
| 9.8 | 2 | 50 | 0.20736 |
| 9.8 | 2 | 10 | 1.0368 |
| 4 | 1 | 30 | 0.0648 |
| 4 | 0.5 | 30 | 0.2724 |
| 1.2 | 0.3 | 3 | 0.1944 |

BEARER SWITCHING IN REDUCED RADIO LINK QUALITY CONDITIONS

RELATED APPLICATION DATA

This application claims priority under 35 U.S.C. § 119(e) from U.S. Provisional Patent Application No. 62/449,687 entitled "Method of Multi-Radio Control for TCP Throughput Enhancement," filed Jan. 24, 2017, the entire disclosure of which is incorporated herein by reference.

BACKGROUND

Millimeter wave radio communications (corresponding to radio frequencies above roughly 10 GHz) afford substantially higher data capacity than their longer wavelength counterparts. Consequently, communications at such frequencies are one of the central enhancements being adopted in the $3^{rd}$ generation partnership project (3GPP) standards for the next generation, so-called 5G, mobile telecommunication networks. While 5G will provide data rates in the 10 Mbit/s-1 Gbit/s range, shorter wavelength radio communications suffer high variability in radio link quality. Indeed, buildings, automobiles and even the human body can interfere with millimeter wave radio, thus diminishing the quality of the affected radio links.

FIG. 9 depicts a blocker 10 being interposed between user equipment (UE) 110 (also referred to as a wireless transmit and receive unit (WTRU)) and a transmitter (not illustrated). As illustrated in the figure, blocker 10 has a dimension W that is transverse to the directionality of the UE antenna, is located a distance D from UE 20 and is moving at velocity V. Table 30 illustrates radio link outage intervals for different types of blockers 10, where items 32 may correspond to a large truck, items 34 may correspond to a passenger automobile and item 36 may correspond to a human body. As FIG. 9 demonstrates, considerable radio link outage may occur in the presence of these blockers.

FIG. 10 illustrates another blockage scenario in which passenger automobiles 12a-12d, representatively referred to herein as automobile(s) 12, are moving at a velocity V and maintaining a distance D safe between one automobile 12 to the next. In such a case, the blockage is intermittent, with the time between successive blockage events being illustrated in Table 40.

While physical layer interference is entirely expected in the presence of blockers, what is less expected is the dramatic effect on the transport layer that such blockage entails. FIG. 11 illustrates the effect on data rate 50 and TCP sender window size (MSS per the Transport Control Protocol (TCP)) 60 responsive to blockage at blocking intervals 55a-55e, representatively referred, to herein as blocking interval(s) 55. As illustrated in the figure, there is significant degradation in data throughput in the presence of blockers, but such degradation is attributable not just by a drop in radio signal strength or quality. Indeed, radio blockage has a profound impact on data transport such as by TCP as demonstrated by Table 1 below.

TABLE 1

| Blockage Model | Blockage Ratio | TCP Throughput | TCP Degradation |
| --- | --- | --- | --- |
| No Blocking | 0% | 807 Mbps | 0% |
| 0.1 s blocking every 5 s | 2% | 712 Mbps | −12% |

TABLE 1-continued

| Blockage Model | Blockage Ratio | TCP Throughput | TCP Degradation |
| --- | --- | --- | --- |
| 0.2 s blocking every 5 s | 4% | 371 Mbps | −54% |
| 1 s blocking every 5 s | 20% | 229 Mbps | −72% |

The causes of such dramatic drop in TCP throughput over the corresponding blockage ratio include TCP sender retransmission timeout (RTO) and congestion control mechanisms was triggered such as window shrinking. Overcoming such degradation in TCP throughput is a subject of ongoing research and engineering efforts.

SUMMARY

A wireless transmit receive unit (WTRU) is configured in dual connectivity with a master cell group and a secondary cell group. Uplink (UL) data is sent in an active one of the master cell group and the secondary cell group as an active UL transmission cell group. It is determined whether a UL transmission is to be switched to an alternate one of the master cell group and the secondary cell group and the UL traffic is switched from the active UL transmission cell group to the alternate cell group in response to the determination that the UL transmission is to be switched.

BRIEF DESCRIPTIONS OF THE DRAWINGS

DESCRIPTION

Figure 1:
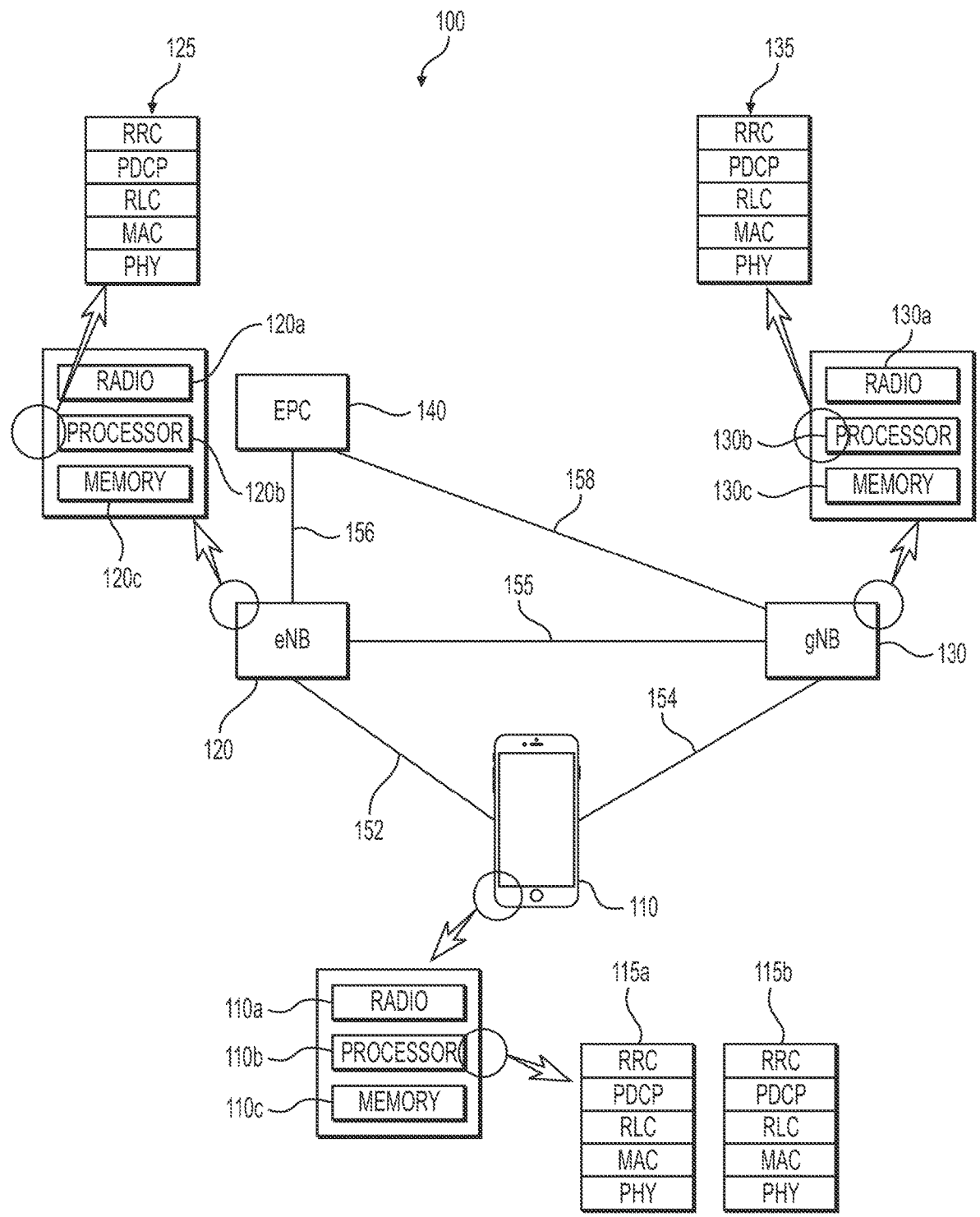
FIG. 1 is a schematic block diagram of an example system in which the present general inventive concept can be embodied.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

Embodiments of the invention ameliorate deteriorative effects on connection-oriented application layer data transport, such as the transmission control protocol (TCP), in the presence radio signal blockage. While the embodiments described herein are directed to mitigating TCP issues in a 5G next generation or "new" radio (NR) embodiments, such is solely for purposes of description and explanation. Those having skill in the art will recognize other network environments in which the present invention can be realized without departing from the spirit and intended scope thereof.

For purposes of succinctness and clarity, suitable shorthand notation will be adopted to indicate a distinction between radio access technologies. While 5G can be considered a progression of the long term evolution (LTE) standards maintained by 3GPP, the acronym LTE will be used herein to refer to legacy LTE evolved universal mobile telecommunications system (UMTS) terrestrial radio access (E-UTRA) implementations, e.g., 4G, while the acronym 5G will refer to implementations that include NR operating at millimeter wavelengths.

FIG. 1 is a schematic block diagram of an example system 100 by which the present invention can be embodied. UE 110 may be a wireless transmit and receive unit (WTRU) comprising radio circuitry 110a, processor circuitry 110b and memory circuitry 110c. UE 110 may be constructed or otherwise configured to communicate with an LTE evolved Node B (eNB) and with a 5G next generation node B (gNB) comprising radio circuitry 120a and 130a, respectively, processor circuitry 120b and 130b, respectively and memory circuitry 120c and 130c, respectively. UE 110 may be communicatively coupled to eNB 120 over a signaling link 152 and to a gNB 130 over a signaling link 154. ENB 120 and gNB 130 may be communicatively coupled to a core network, such as the LTE evolved packet core (EPC) 140, over signaling links 156 and 158, respectively. Additionally, eNB 120 and gNB 130 may be communicatively coupled to each other over suitable signaling link 155. Those having skill in the art will appreciate that, although not illustrated in the figure, signaling links 152, 154, 155, 156 and 158 may carry either or both control plane data and user plane data, depending on the connected entities. The skilled artisan will recognize that environment 100 represents a 5G non-standalone (NSA) architecture implementation.

Resources in eNB 120 and gNB 130, e.g., radio circuitry 120a and 130a, processor circuitry 120b and 130b and memory circuitry 120c and 130c, may be constructed or otherwise configured to realize radio protocol stacks 125 and 135, respectively. Each radio stack 125 and 135 may realize, among others, a radio resource control (RRC) layer, a packet data convergence protocol (PDCP) layer, a radio link control (RLC) layer, a medium access control (MAC) layer and a physical (PHY) layer. The RRC layers, PDCP layers, RLC layers and MAC layers are specifically configured for the radio access technology, LTE or NR, utilized at that particular radio node. Resources in UE 110, e.g., radio circuitry 110a, processor circuitry 110b and memory circuitry 110c, may be constructed or otherwise configured to realize radio protocol stacks 115a and 115b, each comprising an RRC layer, a PDCP layer, an RLC layer, a MAC layer and a PHY layer. Radio protocol stacks 115a and 115b are constructed or otherwise configured for each radio access technology utilized in eNB 120 and gNB 130, e.g., LTE and NR, respectively.

Figure 2:
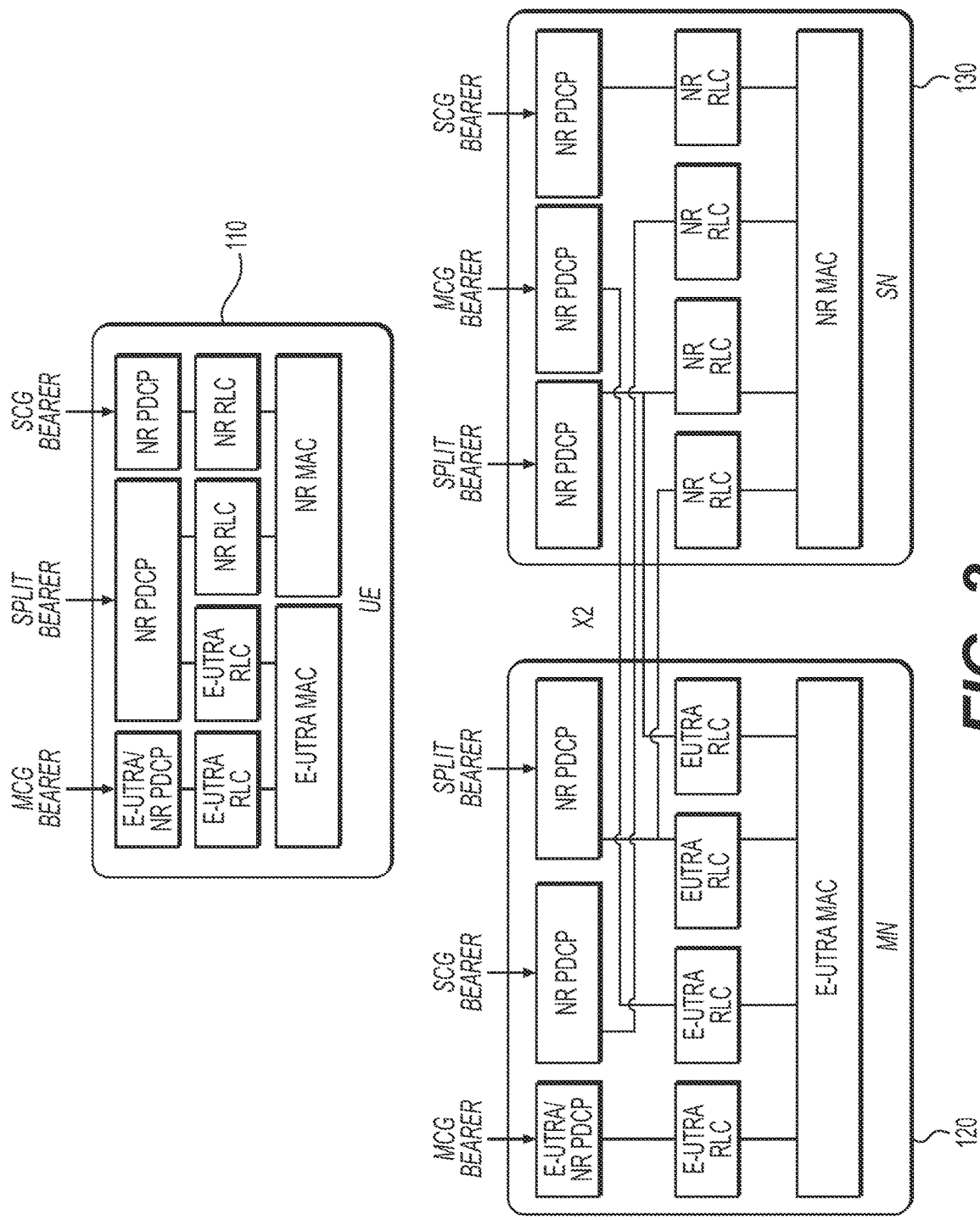
FIG. 2 is a schematic block diagram of an example dual connectivity mode in which embodiments of the present general inventive concept can be configured.

FIG. 2 illustrates a dual connectivity configuration 200 that may be used in conjunction with embodiments of the present invention. In dual connectivity configuration 200, 5G NR PDCP entities may be communicatively coupled to LTE E-UTRA RLC entities. While such coupling takes place onboard UE 110, the communication between eNB 120, serving as master node MN, and gNB 130, serving as secondary node SN, may proceed over the X2 interface. Dual connectivity configuration 200 allows UE 110 to simultaneously transmit and receive data on multiple component carriers from two cell groups via master node MN and secondary node SN. This is a distinction from carrier aggregation (CA) which allows UE 110 to simultaneously transmit and receive data on multiple component carriers from a single base node. CA traffic is split in the MAC layer, while E-UTRAN dual connectivity (EN-DC) is split in the PDCP layer.

In the system configuration of FIG. 1, UE 110 is configured to convey data over alternate links, either through two separate PDCP entities corresponding to individual bearers or a single PDCP entity corresponding to a split bearer. In certain embodiments, traffic is transported over a first bearer between UE 110 and, for example, gNB 130 until the link quality meets some unacceptability criterion, such as an indication of blockage. Responsive to the link quality meeting the unacceptability criterion, traffic may be transferred to an alternative bearer between UE 110 and, for example, eNB 120.

Figure 3:
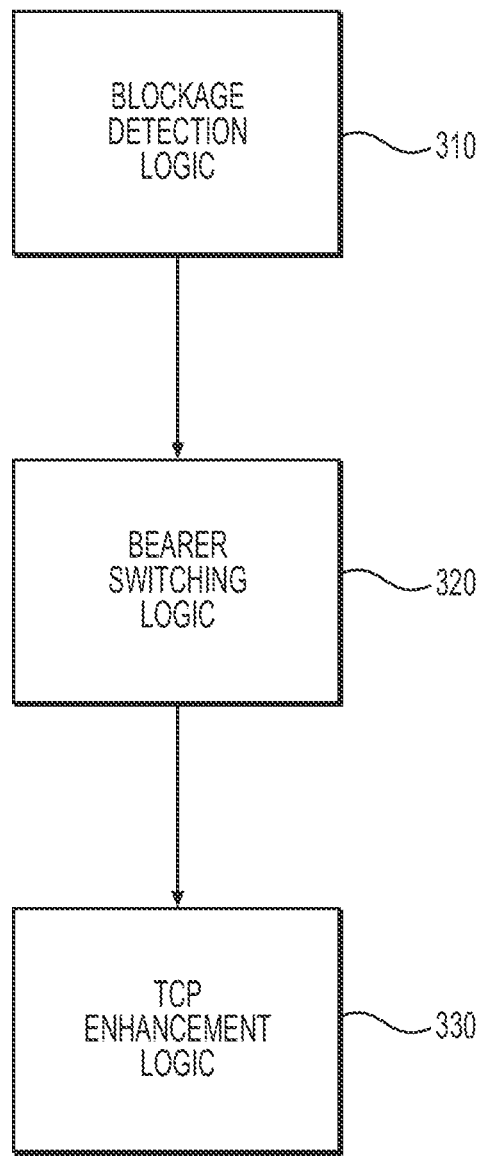
FIG. 3 is a block diagram of example logic flow in accordance with which the present general inventive concept can be embodied.

FIG. 3 is a flow diagram of an exemplary embodiment of the present invention comprising blockage detection logic 310, by which diminished radio link quality situations are identified, bearer switching logic 320, by which radio link quality issues are mitigated and TCP enhancement logic 330, by which TCP operation is restored once such radio link quality mitigation has occurred. It is to be understood that while blockage detection logic 310, bearer switching logic 320 and TCP enhancement logic 330 are illustrated in FIG. 3 as contained in a composite flow, each of these components may be used alone in other contexts, as the skilled artisan will appreciate upon review of this disclosure.

Figure 4:
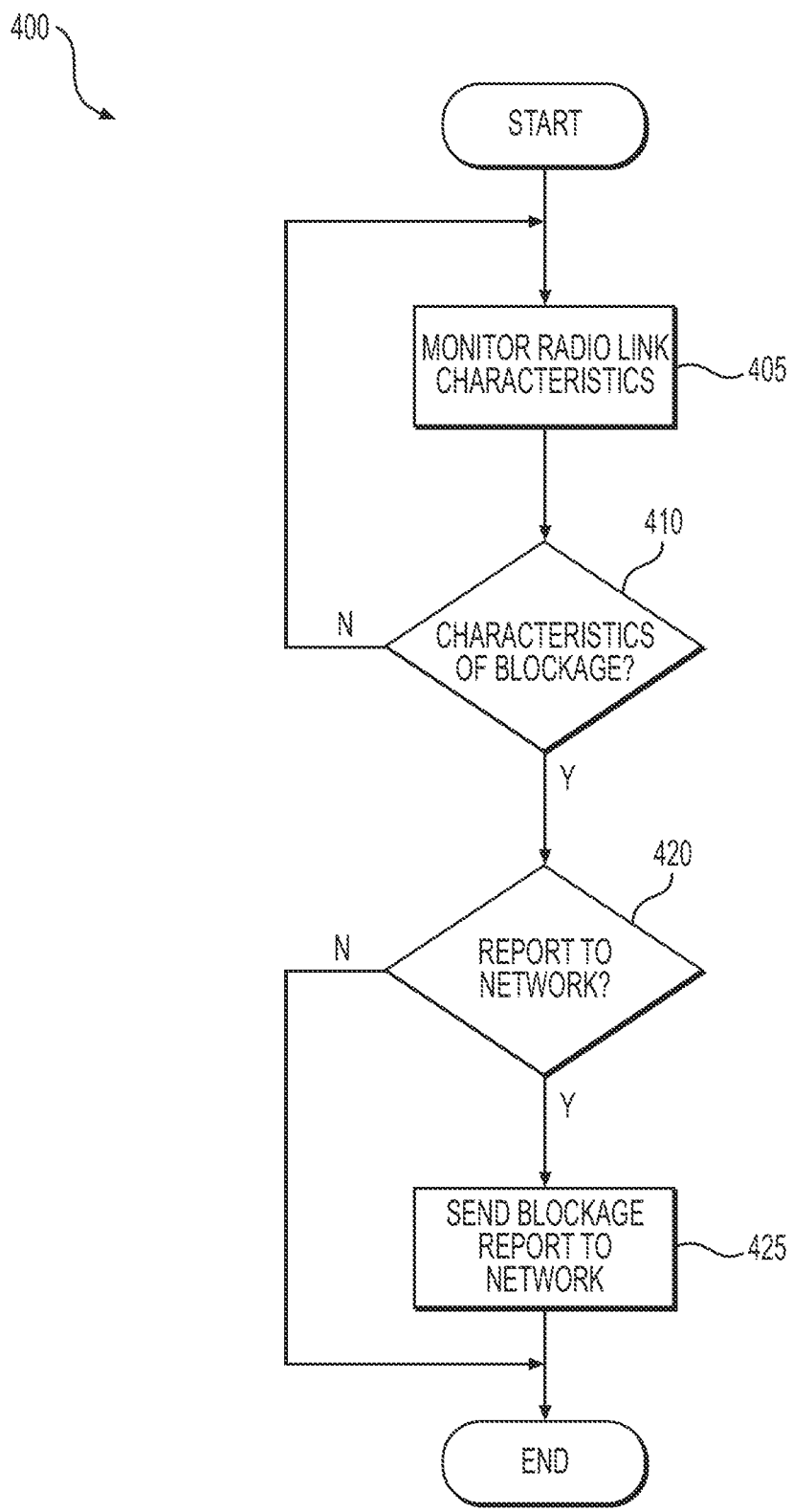
FIG. 4 is a flow diagram of an example blockage detection process by which the present general inventive concept can be embodied.

FIG. 4 is an exemplary blockage detection process 400 that may be implemented by blockage detection logic 310. In operation 405, radio link characteristics of NR are monitored. Blockage detection logic 310 may continuously perform radio link monitoring to determine when radio blockage is occurring. Such may be achieved by various mechanisms onboard UE 110, e.g., conventional measurements configured by the RRC layer and radio link monitoring performed by the Physical layer.

In operation 410, it is determined whether there are characteristics of blockage in the measured radio characteristics. In certain embodiments of the invention, UE 110 may monitor one of several different parameters of the radio link to determine whether blockage is occurring, including reference signal received power (RSRP), reference signal received quality (RSRQ), received signal strength indicator (RSSI), signal to interference plus noise (SINR), block error rate (BLER) and channel quality indicator (CQI). Such parameters may be compared with respective thresholds established by a user or network administrator. In other implementations, blockage may be identified from increasing latency of acknowledgments of RLC PDUs, increasing queuing time in layer 2 buffer and degradation in successful delivery indication as HARQ ACK.

Figure 5A:
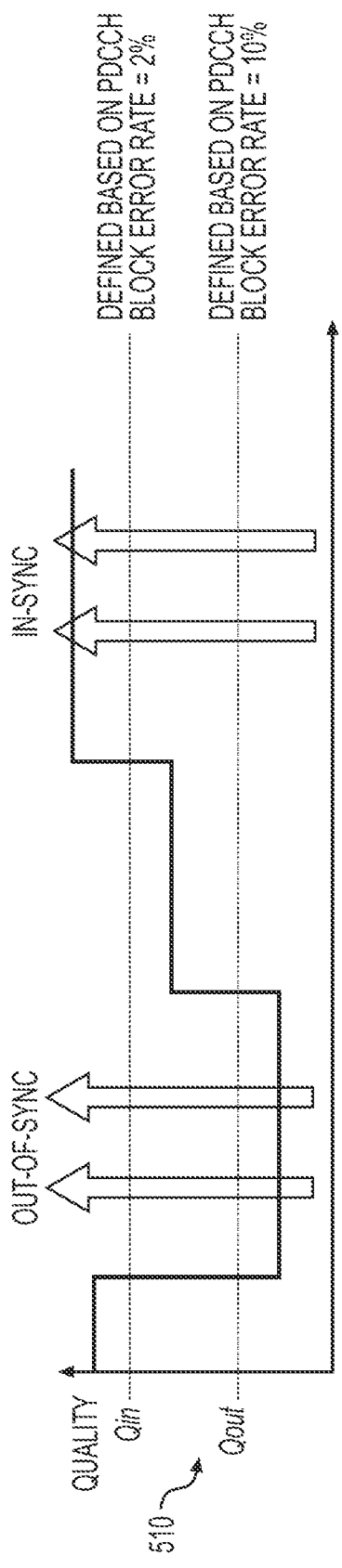
FIGS. 5A-5B are graphs representing different blockage indications that can be used in conjunction with embodiments of the present general inventive concept.

Referring to FIG. 5A, there is illustrated a graph that demonstrates in-sync and out-of-sync conditions according to one embodiment, where selected number of out-of-sync indications provides evidence of radio link blockage. Here, a serving beam and candidate beam are compared to a block error rate (BLER) threshold that determines whether each beam is in-sync or out-of-sync. The BLER may be compared with a suitable threshold, e.g., LTE defines a threshold of 2% (Qin) on the PDCCH block error rate as in-sync and 10% (Qout) as out-of-sync.

Figure 5B:
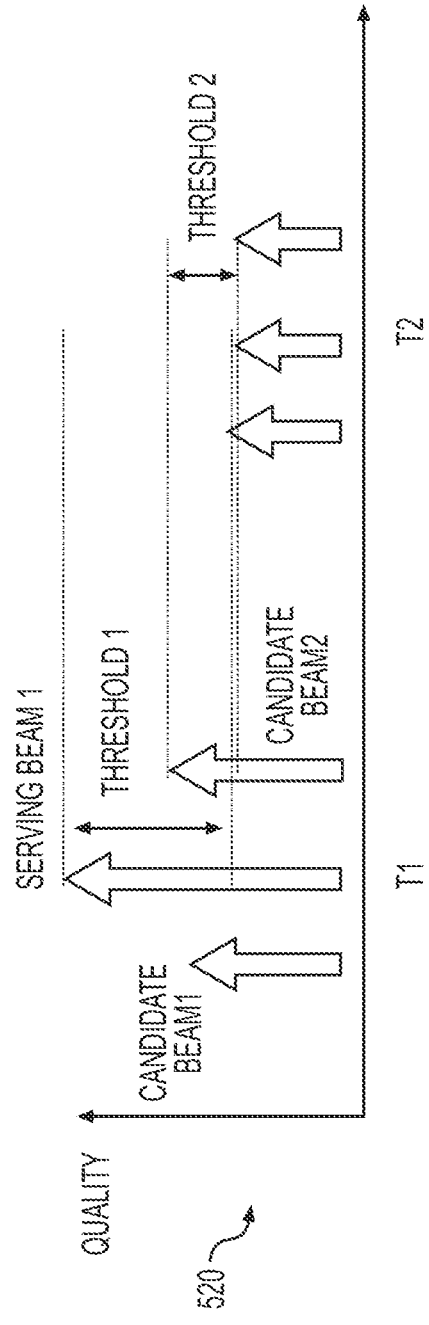

FIG. 5B is another graph depicting how a beam may be identified as blocked. In this case, historical data are maintained and whether a beam is blocked is determined by whether the quality of that beam has decreased by an amount determined from the historical data. Various statistics may be derived from the historical data that can be used to establish an unacceptability criterion, such as a radio quality threshold. For example, Threshold 1 may be a difference between a current radio link measurement on a serving beam and a historical radio link measurement and Threshold 2 may be a difference between a current radio link measurement on a candidate beam and the historical radio link measurement.

Returning to FIG. 4, if it is determined at operation 410 that there are characteristics of blockage present, process 400 may transition to operation 420, by which it is determined whether a blockage report is to be issued by UE 110. In certain embodiments, a blockage report is a suitably formatted message that indicates to network entities that a blockage condition (such as determined per the unacceptability criterion described above) exists. Such message may contain information relevant to radio resource management, such as measurement result and beam information. The radio resource manager may utilize the information to take some action, e.g., select a different beam or assert another scheduling policy. In certain implementations, a blockage report may not be necessary, in which case the sending of the report can be omitted. If a report is to be issued by UE 110, as determined in operation 420, embodiments of the invention may format and convey a blockage report indicating such to the network in operation 425. The blockage report can be sent via a newly active uplink, such as described below.

Responsive to blockage being detected, embodiments of the invention may perform bearer switching from an NR bearer to an LTE bearer. Two modes of bearer switching are contemplated for embodiments of the invention: an autonomous mode in which the uplink is switched from NR to LTE without a prior report being sent and a network assisted mode in which the uplink is switched only after the network has approved the switch in response to a blockage or other report. For example, in certain embodiments, UE 110 may format and send an RRC measurement report to EPC 140, in response to which EPC 140 may initiate an RRC connection reconfiguration procedure with UE 110. In the autonomous switching mode, UE 110 does not require an RRC message to command the switching, instead, the UE itself selects the UL transmission path among the two cell groups.

Figure 6:
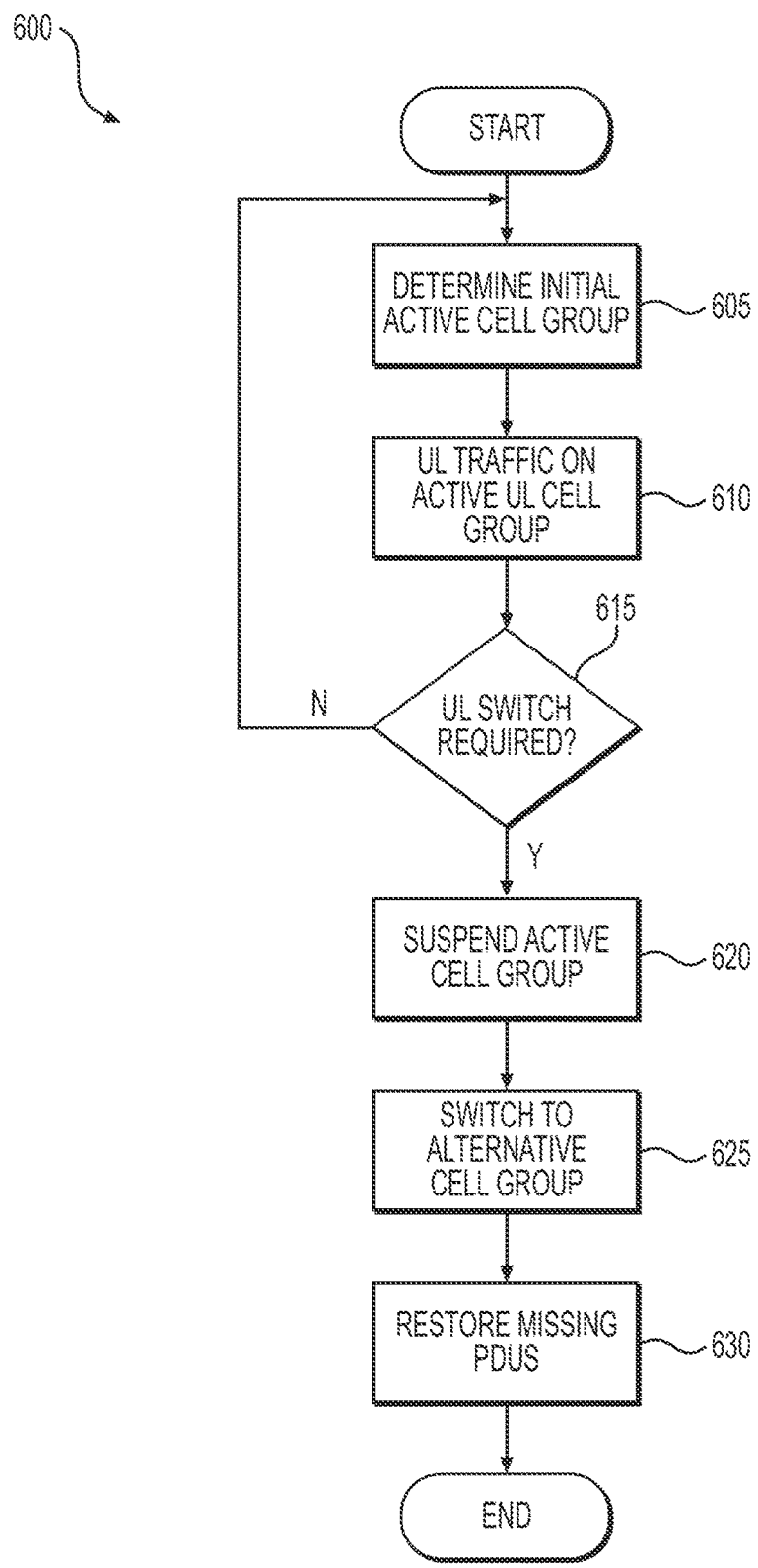
FIG. 6 is a flow diagram of an example uplink bearer switching process by which the present general inventive concept can be embodied.

FIG. 6 is a flow diagram of an exemplary bearer switching process 600 that may be implemented by bearer switching logic 320. In operation 605, UE 110 determines of selects an active uplink cell group. For example, UE 110 may select NR link as active cell group with gNB 130. Uplink traffic is conveyed over the active link in operation 610, where the LTE radio is utilized as a backup radio in the event of blockage. In certain embodiments, when UE 110 is not in active transmission mode with any one of the cell groups, the associated radio circuitry can be placed in a reduced power mode.

In operation 615, it is determined whether an uplink switch is required. Such uplink switching may be required when a blockage condition exists, but the invention is not so limited. If uplink switching is required, process 600 may transition to operation 620, by which transmissions between UE 110 and the active cell group are suspended. In operation 625, UE 110 switches to or otherwise selects an alternative cell group, e.g., eNB 120, Once this has been achieved, radio link monitoring may continue in order to determine when the blocking condition (or other unacceptable condition) is lifted.

In operation 630, missing PDUs are restored. During the latency period between when the radio link quality fails and when the radio switching occurs, some packets may be lost. In one embodiment, the PDCP layer shall guarantee that data for which an acknowledgment has not been received is retransmitted. In certain embodiments, upon UE 110 switching the radio link, UE 110 shall ensure the data sent but unacknowledged in the previous link are retransmitted in the new link responsive to a request for such from EPC 140. In other embodiments, a report may be formatted and conveyed so that missing blocks can be retransmitted over LTE. This may be achieved by a suitably formatted PDCP status report.

Certain embodiments implement a rapid recovery mechanism employed when it is determined that blockage has been lifted and system 100 is to recover. For example, when there are characteristics of blockage present, the original UL configuration is cached under a resumptive configuration ID for rapid re-establishment of NR operations once the blockage ceases. In certain embodiments, this may be achieved by requesting relevant information, e.g., cell ID, band configuration, etc., from the network via eNB 120. Upon recovery, both the network and the UE 110 can recall its configuration from memory by the resumptive configuration ID. UE 110 may switch traffic to its NR in recovering from a previous switch according to the configuration data stored under the resumptive configuration ID.

Figure 7:
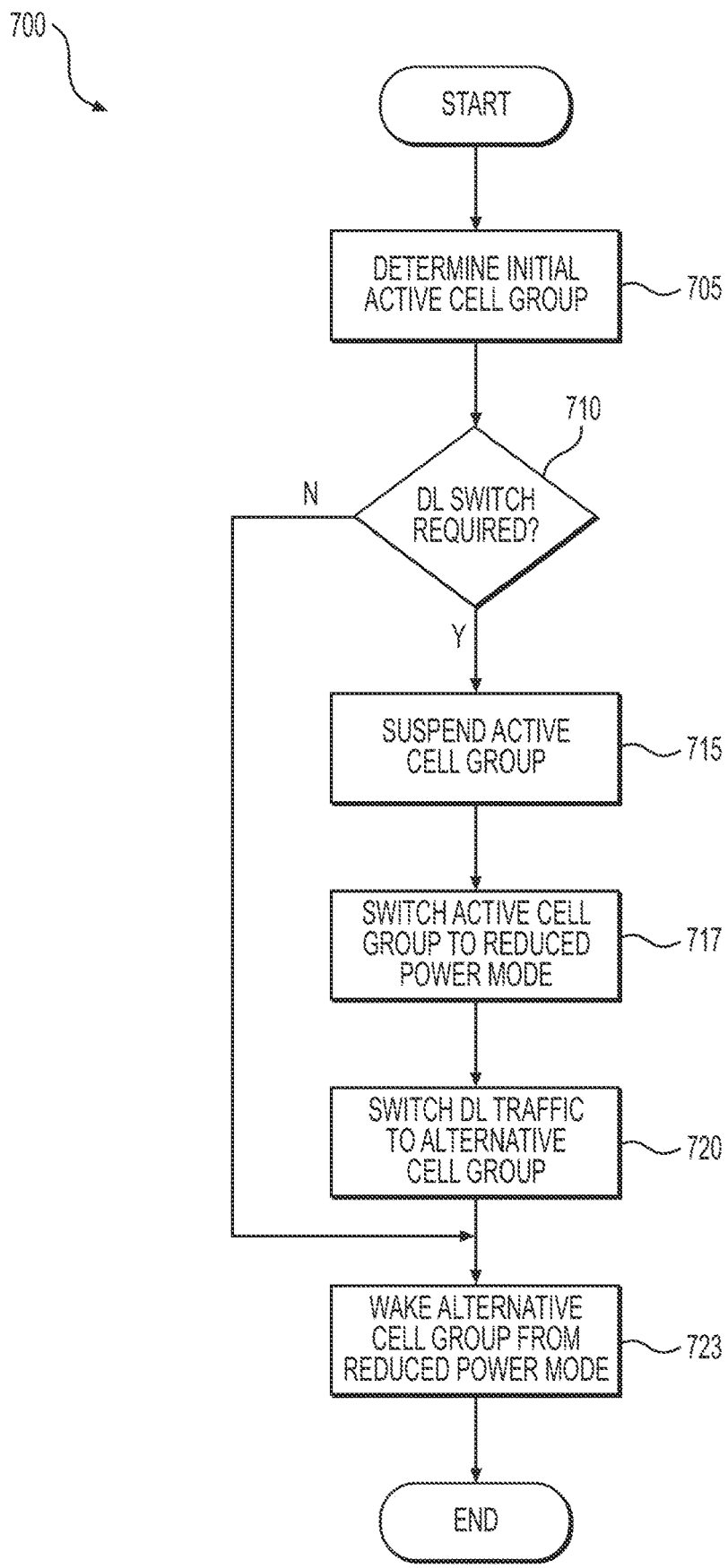
FIG. 7 is a flow diagram of an example downlink bearer switching process by which the present general inventive concept can be embodied.

FIG. 7 is a flow diagram of an example downlink bearer switching process 700. In operation 705, UE 110 receives its initial configuration to select a link in an active downlink cell group. For example, UE 110 may establish a link with gNB 130. In operation 710, it is determined whether downlink switching, is required, such as in the case of blockage. If downlink switching is required, process 700 may transition to operation 715, by which downlink transmissions between UE 110 and the active cell group are suspended. In operation 717, UE 110 switch the transmissions with the active cell group into reduced power mode. In operation 720, UE 110 switches to or otherwise selects an alternate cell group, e.g., eNB 120. In operation 723, the alternate cell is awoken from its reduced power mode.

Figure 8:
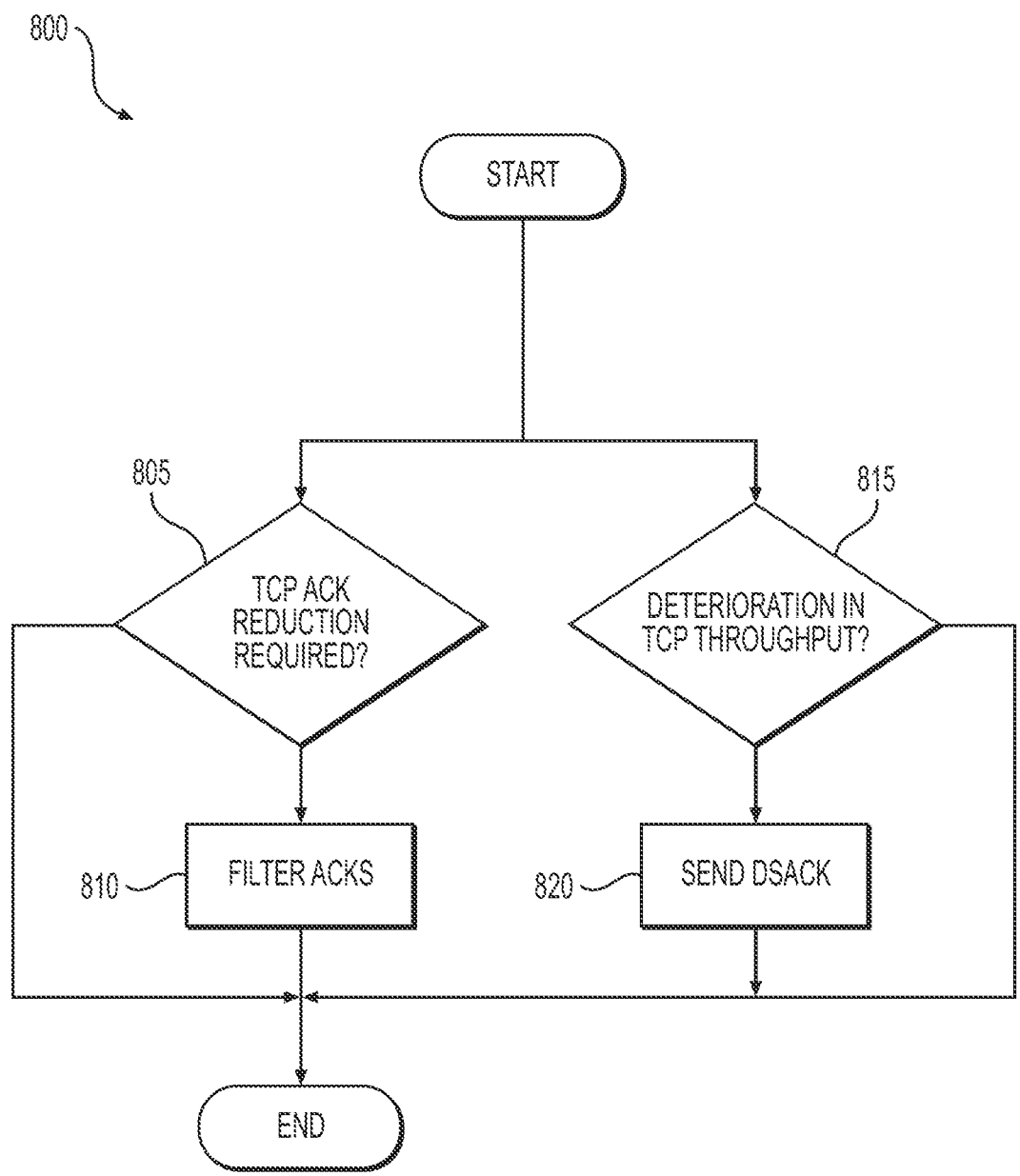
FIG. 8 is a flow diagram of an example TCP enhancement process by which the present general inventive concept can be embodied.
Figure 9:
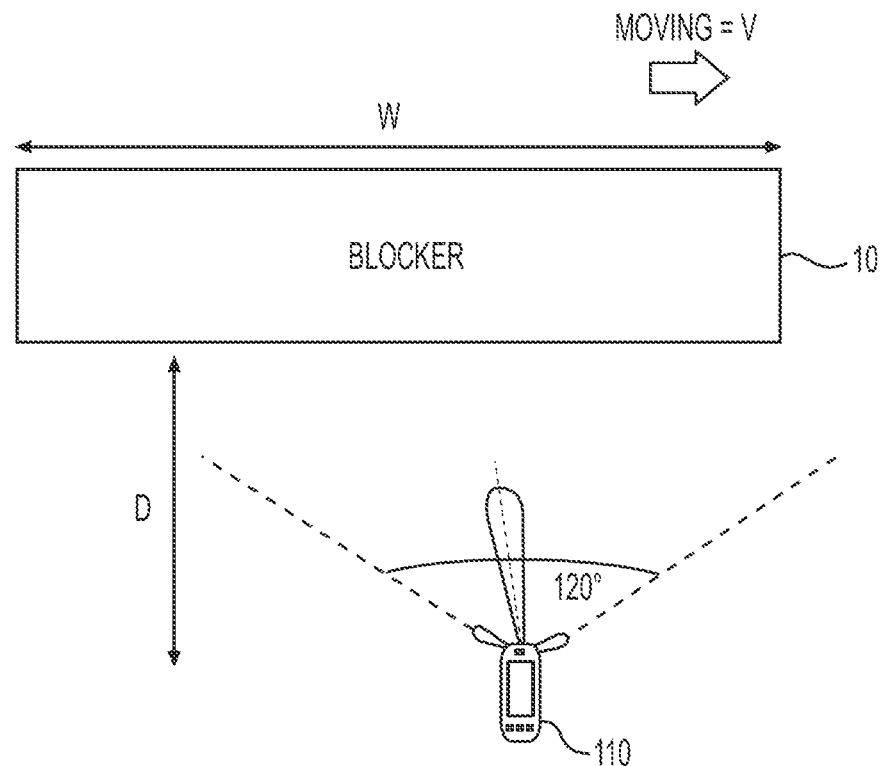
FIG. 9 is a diagram of a millimeter wave radio blockage scenario.
Figure 10:
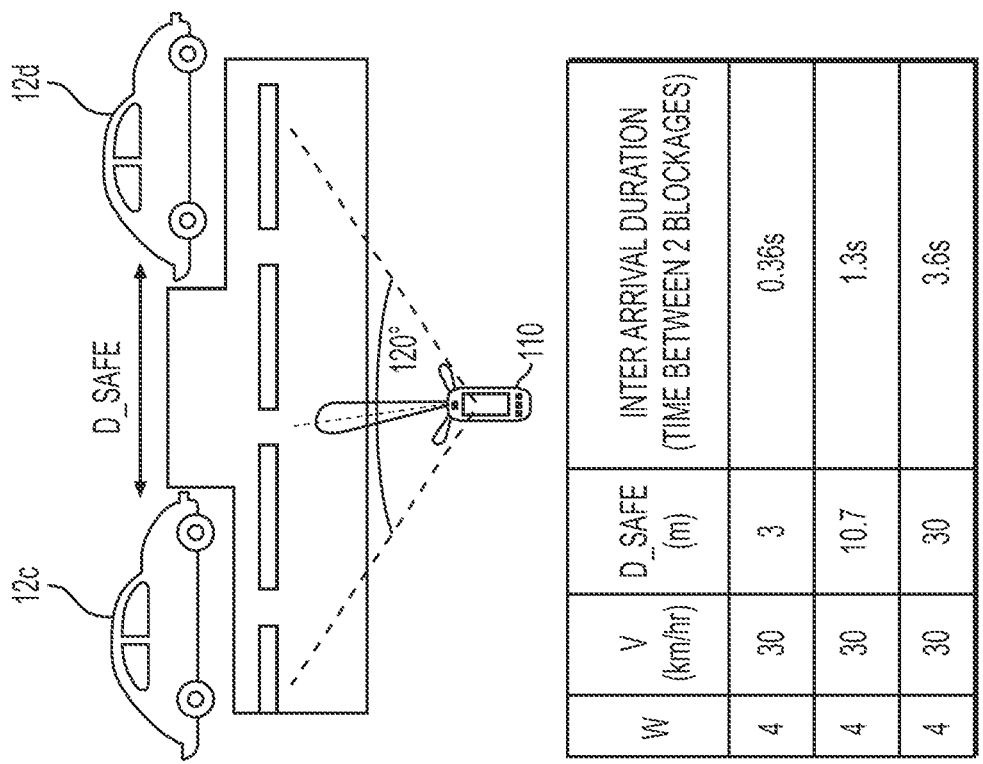
FIG. 10 is a diagram of another millimeter wave radio blockage scenario.
Figure 10:
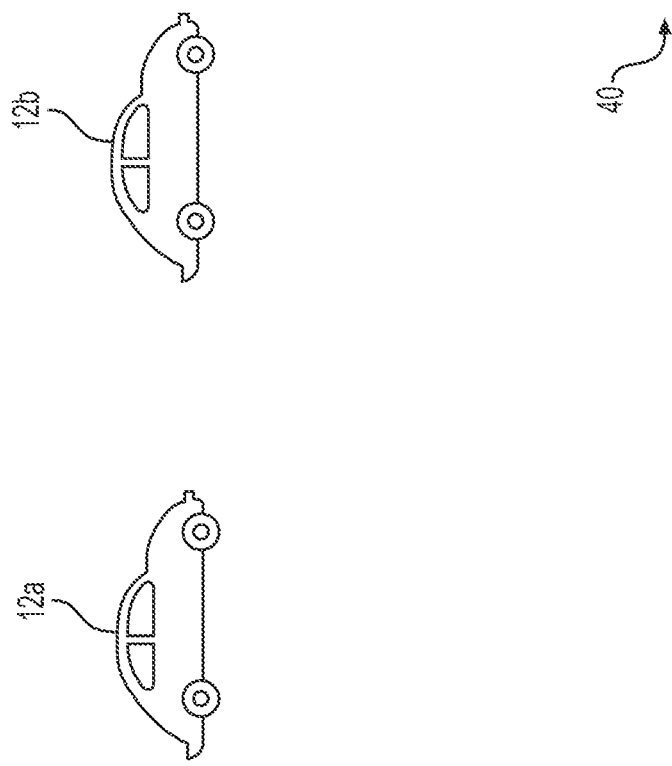
Figure 11:
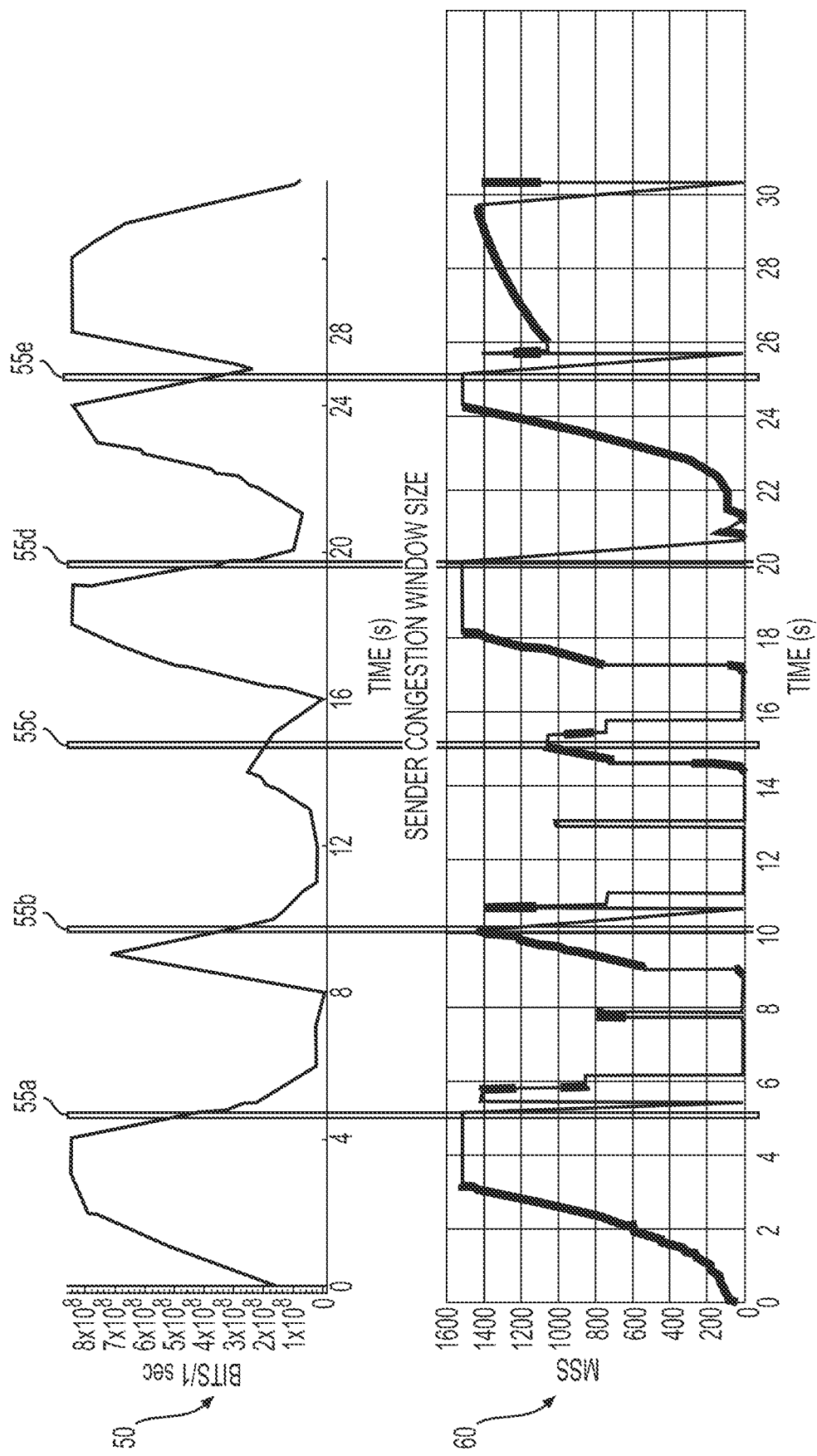
FIG. 11 is a set of graphs illustrating the impact of millimeter wave radio blockage on TCP throughput.

Once a quality radio link has been established over LTE, embodiments of the invention may turn to mitigating TCP flow and congestion control issues created when the NR radio link failed. FIG. 8 is a flow diagram of an exemplary TCP enhancement process 800 that may be implemented in TCP enhancement logic 330. In operation 805, it is determined whether TCP ACK reduction is required, such as to conserve radio resources. If so, process 800 may transition to operation 810, by which TCP ACKs are filtered to remove those that can be omitted and replaced by a single ACK with the suitably encompassing sequence number. Additionally, as illustrated in FIG. 8, embodiments of the invention may determine whether there is deterioration in TCP throughput, such as by monitoring flows in the active link. If so, process 800 may transition to operation 820, whereby UE 110 may send an upstream DSACK to return the window to its original state.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefor, elements and methods individually described may be combined, and elements described as discrete may be distributed across many components. The scope of the invention should therefore be determined not with reference to the description above, but with reference to the appended claims, along with their full range of equivalents.

The invention claimed is:

1. A method of bearer switching in a wireless transmit receive unit (WTRU) that is configured in dual connectivity with a master cell group using a first radio bearer for communications and a secondary cell group using a second radio bearer for communications that is other than the first radio bearer, the method comprising:
   sending by the WTRU uplink (UL) data traffic over one of the first radio bearer of the master cell group and the second radio bearer of the secondary cell group as an original UL transmission radio bearer;
   determining, autonomously by the WTRU, whether a UL transmission containing the UL data traffic is to be switched to an alternate one of the master cell group and the secondary cell group; and
   switching, autonomously by the WTRU, transmission of the UL data traffic over the original UL transmission radio bearer to a radio bearer of the alternate cell group in response to the determination that the UL transmission containing the UL data traffic is to be switched.

2. The method of claim 1, further comprising suspending UL transmission over the original UL transmission radio bearer and resuming UL transmission over the radio bearer of the alternate cell group.

3. The method of claim 2, further comprising retransmitting a first packet data convergence protocol (PDCP) service data unit (SDU) for which a successful delivery to a lower layer of the alternate cell group has not been confirmed by a lower layer of the master cell group or the secondary cell group using the original UL transmission radio bearer.

4. The method of claim 1, wherein the determination of whether the UL transmission is to be switched is triggered by receiving a radio resource control (RRC) reconfiguration message or a media access control (MAC) control element or a PDCP control protocol data unit (PDU) from a gNB.

5. The method of claim 1 wherein the determination of whether the UL transmission is to be switched is triggered by measurement by the WTRU.

6. The method of claim 5, wherein the WTRU measurement further comprises determining if a blockage event has occurred in the master cell group or the secondary cell group using the original UL transmission radio bearer.

7. The method of claim 5, wherein the WTRU measurement further comprises measuring latency on acknowledge messages of radio link control (RLC) PDUs or measuring successful delivery indications from a lower layer or measuring queuing time of data in transmission data buffer.

8. The method of claim 7, wherein the latency is measured by a timer whose value is configured at a gNB.

9. The method of claim 7, wherein the latency may be measured from a statistic of a previous transmission over the original UL transmission radio bearer.

10. The method of claim 5, wherein the WTRU measurement further comprises detecting degradation in radio link measurements in the original UL transmission radio bearer.

11. The method of claim 1, wherein the determination of whether the UL transmission is to be switched further comprises triggering the sending of a UL message to a gNB to request cell group switching for UL transmission and waiting for the gNB to grant the request.

12. A method of bearer switching in a wireless transmit receive unit (WTRU) which is configured in dual connectivity with a master cell group using a first radio bearer for communications and a secondary cell group using a second radio bearer for communications that is other than the first radio bearer, the method comprising:
   receiving downlink (DL) data traffic over one of the first radio bearer of the master cell group and the second radio bearer of the secondary cell group as an original DL reception radio bearer;
   determining, by the WTRU, whether a DL transmission containing the DL data traffic is to be switched to an alternate one of the master cell group and the secondary cell group;
   sending, by the WTRU, an uplink (UL) message to a gNB to request for transmission cell group switching of the DL data traffic using the original DL reception radio bearer to using the radio bearer of the alternate one of the master cell group and the secondary cell group in response to the determination that the DL reception is to be switched; and
   configuring the original DL reception cell group into a low power mode.

13. The method of claim 12, further comprising suspending DL reception over the original DL reception radio bearer and resuming DL reception over the radio bearer of the alternate cell group.

14. The method of claim 12, wherein the UL message is either via radio resource control (RRC) message or packet data conversion protocol (PDCP) control protocol data unit (PDU) or media access control (MAC) control element (CE) or channel quality indicator (CQI) report received over the original DL reception radio bearer.

15. The method of claim 12, wherein the UL message is either via RRC message or PDCP control PDU or MAC CE or CQI in a cell group other than that using the original DL reception radio bearer.

16. An apparatus comprising:
   radio circuitry by which wireless electromagnetic radio signals are conveyed in dual connectivity with a master cell group using a first radio bearer for communications and a secondary cell group using a second radio bearer for communications that is other than the first radio bearer; and
   a processor electrically coupled to the radio circuitry and configured to:
   send uplink (UL) data traffic over one of the first radio bearer of the master cell group and the second radio bearer of the secondary cell group as an original UL transmission radio bearer;

determine whether a UL transmission containing the UL data traffic is to be switched to an alternate one of the master cell group and the secondary cell group; and switch transmission of the UL data traffic over the original UL transmission radio bearer to a radio bearer of the alternate cell group in response to the determination that the UL transmission containing the UL data traffic is to be switched.

17. The apparatus of claim 16, the processor is further configured to suspend UL transmission over the original UL transmission radio bearer and resume UL transmission over the radio bearer of the alternate cell group.

18. The apparatus of claim 17, further comprising retransmitting a first packet data convergence protocol (PDCP) service data unit (SDU) for which a successful delivery to a lower layer of the alternate cell group has not been confirmed by a lower layer of the master cell group or the secondary cell group using the original UL transmission radio bearer.

19. The apparatus of claim 16, wherein the processor is further configured to determine whether the UL transmission is to be switched by receiving a radio resource control (RRC) reconfiguration message or a media access control (MAC) control element or a PDCP control protocol data unit (PDU) from a gNB.

20. The apparatus of claim 16, wherein the processor is further configured to determine whether the UL transmission is to be switched is triggered by measurement of the radio circuitry.

* * * * *